United States Patent
Lee

(10) Patent No.: US 9,346,447 B2
(45) Date of Patent: May 24, 2016

(54) SOLENOID VALVE FOR BRAKE SYSTEM

(71) Applicant: MANDO CORPORATION, Pyeongtaek-si, Gyeonggi-do (KR)

(72) Inventor: Chung Jae Lee, Gunpo-si (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 14/684,167

(22) Filed: Apr. 10, 2015

(65) Prior Publication Data

US 2015/0291142 A1 Oct. 15, 2015

(30) Foreign Application Priority Data

Apr. 11, 2014 (KR) .......................... 10-2014-0043467

(51) Int. Cl.
*F16K 31/06* (2006.01)
*B60T 15/02* (2006.01)
*H01F 3/00* (2006.01)

(52) U.S. Cl.
CPC ........... *B60T 15/027* (2013.01); *F16K 31/0693* (2013.01); *F16K 31/062* (2013.01); *F16K 31/0637* (2013.01); *H01F 3/00* (2013.01)

(58) Field of Classification Search
CPC ... B60T 15/025; B60T 15/027; B60T 8/3615; B60T 8/366; F16K 31/0693; F16K 31/062; F16K 31/0637; F16K 31/0686; H01F 3/00
USPC ........ 251/129.02, 129.07, 129.15; 303/119.2; 335/281
See application file for complete search history.

(56) References Cited

U.S. PATENT DOCUMENTS

| 5,971,501 A * | 10/1999 | Hosoya | B60T 8/365 303/119.2 |
| 7,497,232 B2 * | 3/2009 | Muller | F16K 31/061 137/596.17 |
| 7,871,056 B2 * | 1/2011 | Kratzer | B60T 8/363 251/129.02 |
| 2009/0121541 A1 * | 5/2009 | Lee | B60T 8/363 303/119.2 |
| 2015/0233488 A1 * | 8/2015 | Holmes | F16K 31/0693 251/129.07 |

FOREIGN PATENT DOCUMENTS

KR  2003-0067843 A  8/2003

* cited by examiner

*Primary Examiner* — Matthew W Jellett
(74) *Attorney, Agent, or Firm* — McDermott Will & Emery LLP

(57) ABSTRACT

Disclosed is a solenoid valve for a brake system, the solenoid valve including a magnet core that is provided in a cylindrical shape, is installed in a bore of a modulator block, and has a through-hole opening in a lengthwise direction thereof and a radial direction passage communicating with the through-hole; an armature that is installed at one end of the magnet core so as to be reciprocated; a valve seat that is provided at the other end of the magnet core and has an orifice; a plunger that is inserted into the through-hole and performs a sliding motion by the armature to open and close the orifice; a sleeve that is fixed to the bore while accommodating the armature and the magnet core; and a return spring that is provided to apply an elastic restorative force to the plunger to open the orifice, wherein a passage hole is provided in a spiral shape along the through-hole at an inner circumferential surface of the magnet core to discharge air between the magnet core and the plunger and air between the magnet core and the armature.

4 Claims, 3 Drawing Sheets

SOLENOID VALVE FOR BRAKE SYSTEM

CROSS-REFERENCE TO RELATED APPLICATION

This application claims the benefit of Korean Patent Application No. 2014-0043467, filed on Apr. 11, 2014 in the Korean Intellectual Property Office, the disclosure of which is incorporated herein by reference.

BACKGROUND

1. Field

Embodiments of the present invention relate to a solenoid valve for a brake system, and more particularly, to a solenoid valve for a brake system capable of easily discharging air inside the solenoid valve and thus improving a control performance of the solenoid valve.

2. Description of the Related Art

A hydraulic brake system is installed in a vehicle as an essential element to perform a braking operation. In this regard, various brake systems have been recently suggested to provide more strong and stable braking force. Examples of the hydraulic brake system include an Anti-Lock Brake System (ABS) for preventing skid of wheels at the time of the braking, a brake traction control system (BTCS) for preventing slip of driving wheels at the time of a sudden acceleration incident or an unintended acceleration, and an electronic stability system (ESC) implemented as a combination of an ABS and a traction control to maintain a stable driving state of a vehicle by controlling a liquid pressure of a brake.

In order to implement a brake system, a modulator block has a plurality of solenoid valves that are electronically controlled, and a passage (a hydraulic circuit) is selectively open and closed by the solenoid valve. The solenoid valve is divided into a normal open type solenoid valve that remains normally opened, and a normal closed type solenoid valve that remains normally closed.

In general, the normal open type solenoid valve includes a magnet core provided at a center thereof with a through-hole formed lengthwise thereof and provided at a periphery thereof with an outlet, a domed sleeve installed at an upper portion of the magnet core, an armature installed inside the sleeve so as to be reciprocated, and an excitation coil installed at an outer side of the sleeve to reciprocate the armature.

Inside the through-hole of the magnet core, a plunger, a valve seat and a return spring are installed. The plunger is reciprocated according to an operation of the armature. The valve seat is provided with an orifice that is open and closed by the plunger. The return spring allows the plunger to be pushed toward the armature such that the orifice is open when power is not applied to the excitation coil.

The solenoid valve is installed on the modulator block to selectively open or close the orifice through the operations of the armature and the plunger, thereby controlling a flow of oil in the passage formed on the modulator block.

PRIORITY ART DOCUMENT

Korean Unexamined Patent Publication No. 2003-0067843 (Aug. 19, 2003).

However, the solenoid valve has difficulty in discharging air that remains between the magnet core and the armature, and between the magnet core and the plunger, which causes vibration and noise at the opening/closing of the orifice, and degrades the performance of the valve.

SUMMARY

Therefore, it is an aspect of the present invention to provide a solenoid valve for a brake system, capable of preventing vibration and noise that occur at the time of driving the solenoid valve by smoothly discharging air inside the valve.

Additional aspects of the invention will be set forth in part in the description which follows and, in part, will be obvious from the description, or may be learned by practice of the invention.

In accordance with one aspect of the present invention, a solenoid valve for a brake system includes a magnet core, an armature, a valve seat, a plunger, a sleeve, and a return spring. The magnet core may be provided in a cylindrical shape, may be installed in a bore of a modulator block, and may have a through-hole opening in a lengthwise direction thereof and a radial direction passage communicating with the through-hole. The armature may be installed at one end of the magnet core so as to be reciprocated. The valve seat may be provided at the other end of the magnet core and may have an orifice. The plunger may be inserted into the through-hole and may perform a sliding motion by the armature to open and close the orifice. The sleeve may be fixed to the bore while accommodating the armature and the magnet core. The return spring may be provided to apply an elastic restorative force to the plunger to open the orifice. A passage hole may be provided in a spiral shape along the through-hole at an inner circumferential surface of the magnet core to discharge air between the magnet core and the plunger and air between the magnet core and the armature.

The passage hole may be molded in a form rolling.

The magnet core may be provided at an inner circumferential surface thereof with a spring support ledge protruding to support a lower end of the return spring. The plunger may be provided with an outer circumferential surface thereof with a step portion stepped inward to support an upper end of the return spring. One end of the passage hole may extend to a portion between the magnet core and the armature, and the other end of the passage hole may extend to a portion between the spring support ledge and the step portion, to expand a gap between the magnet core and the armature and a gap between the magnet core and the plunger.

The passage hole may connect to the orifice through a transfer passage hole formed lengthwise along the spring support ledge.

As is apparent from the above, the solenoid valve for the brake system according to the embodiment of the present invention can prevent noise and vibration that may be caused by air remaining in the solenoid valve by using a spiral passage hole provided at an inner circumferential surface of the magnet core to naturally discharge air remaining between the magnet core and the armature and between the magnet core and the plunger in the valve at the time of operation of the plunger.

In addition, the spiral passage hole provided in the magnet core of the solenoid valve for the brake system according to the embodiment of the present invention is manufactured by a form rolling to have a superior concentricity, thereby effectively preventing a center deviation of a plunger that may occur due to a repeated long-term operation.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
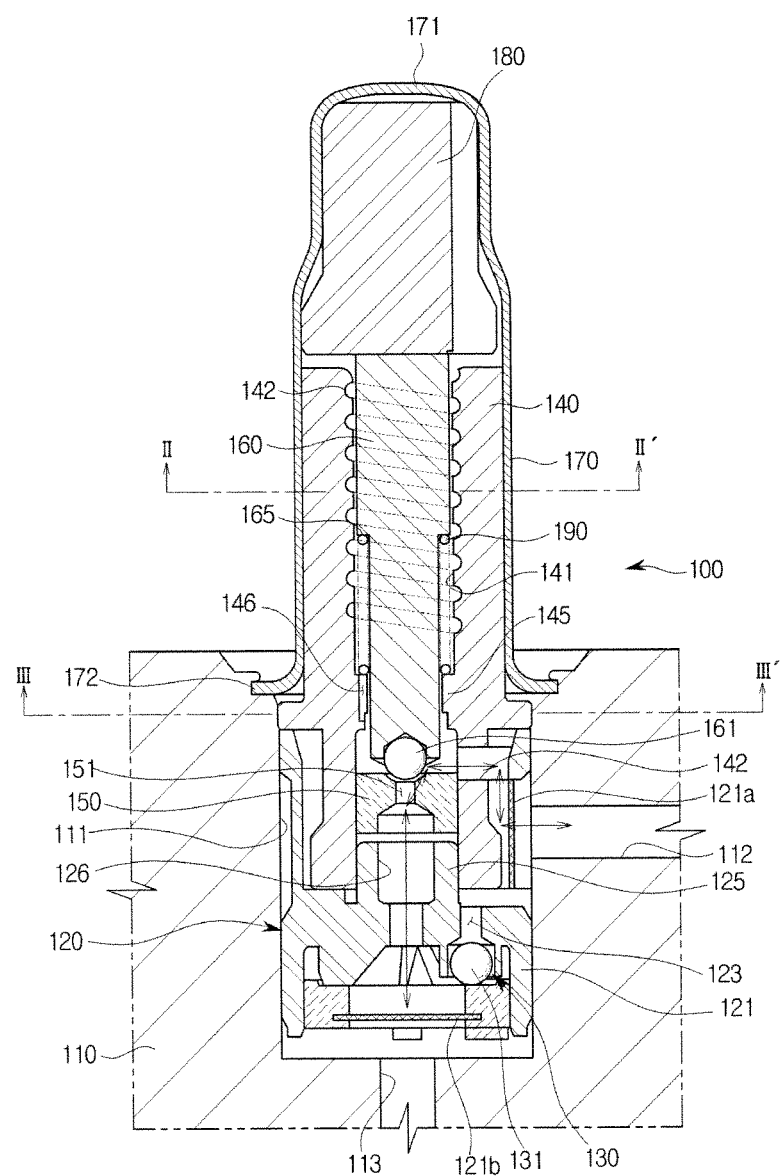
FIG. 1 is a cross-sectional view illustrating a solenoid valve for a brake system in accordance with one embodiment of the present invention.

Various embodiments will now be described more fully with reference to the accompanying drawings in which some embodiments are shown. These inventive concepts may, however, be embodied in different forms and should not be construed as limited to the embodiments set forth herein. Rather, these embodiments are provided so that this disclosure is thorough and complete and fully conveys the inventive concept to those skilled in the art. In the drawings, the sizes and relative sizes of layers and regions may be exaggerated for clarity.

FIG. 1 is a cross-sectional view illustrating a solenoid valve for a brake system in accordance with one embodiment of the present invention.

Referring to the drawing, a solenoid valve for a brake system according to an embodiment of the present invention 100 includes a filter member 120 accommodated in a bore 111 of a modulator block 110, a magnet core 140 coupled to the filter member 120, a valve seat 150 and a plunger 160 that are installed in the magnet core 140, a sleeve 170 coupled to an outer side of the magnet core 140, an armature 180 provided in the sleeve 170, a return spring 190 applying an elastic force to move the plunger 160 toward the armature 180, and an excitation coil assembly (not shown) installed at an outer side of the sleeve 170.

The magnet core 140 is provided with a cylindrical shape while having a through-hole 141 formed in a lengthwise direction thereof, and having a radial passage 142 radially formed at a lower portion of the magnet core 140 to communicate with the through-hole 141. The valve seat 150 having an orifice 151 is press fitted to the inside of the through-hole 141 of the magnet core 140. In addition, the magnet core 140 is provided at an inner circumferential surface thereof with a spring support ledge 145 protruding to support a lower end of the return spring 190.

The filter member 120 is introduced and installed to the bore 111 of the modulator block 110 in a state of being coupled to the magnet core 140. The filter member 120 includes a periphery portion 121 surrounding an outer surface of the lower portion of the magnet core 140, and an insert portion 125 positioned at the lower end of the magnet core 140 and integrally formed with the periphery portion 121 so to be press fitted to the through-hole 141. The periphery portion 121 accommodates the lower portion of the magnet core 140, and has an outer surface thereof supported by an inner surface of the bore 111 of the modulator block 100. The insert portion 124 is provided at a center thereof with a connecting passage 126 connected to the through-hole 141 of the magnet core 140, so as to be insertedly coupled to the through-hole 141 of the magnet core 140. The connecting passage 125 communicates with the through-hole 141 in a lengthwise direction of the magnet core 140.

In addition, the periphery portion 121 of the filter member 120 is additionally provided with a bypass passage 123 formed at an outside of the connecting passage 126. The periphery portion 121 is provided with a first filter portion 121a to filter foreign substance of oil passing through a first passage 112 of the modulator block 110, and a second filter portion 121b to filter foreign substance of oil passing through a second passage 113 of the modulator block 110. The first filter portion 121a and the second filter portion 121b are provided at positions of the periphery portion 121 facing the first passage 112 and the second passage 113, respectively.

Meanwhile, the bypass passage 123 formed at the filter member 120 allows an oil pressure transferred through the first passage 112 from between the first passage 112 and the second passage 113 to flow to the second passage 113. That is, the bypass passage 123 is provided to flow oil independent of a passage allowing oil to pass through the radial passage 142 and the through-hole 141 of the magnet core 140 at a braking operation. A check valve 130 is installed. The check valve 130 includes an opening/closing ball 131 installed in the bypass passage 123 so as to be reciprocated. The opening/closing ball 131 opens the bypass passage 123 at a braking operation, and closes the bypass passage 123 upon termination of a braking operation.

The plunger 160 is installed to be reciprocated up and down in the through-hole 141 at the upper side of the valve seat 150. The plunger 160 is provided at a lower end thereof with an opening/closing portion 161 to open/close the orifice 151. In addition, the plunger 160 is pushed toward the armature 180 by the return spring 190 to open the orifice 151 when power is not applied to the excitation coil assembly (not shown). In this case, the plunger 160 is provided at an upper outer side thereof with a step portion 165 stepped outward to support one end of the return spring 190 so that the return spring 190 is stably installed on the step portion 165 to provide the plunger 160 with an elastic force. A spring support ledge 145 having a step is provided at the through-hole 141 of the magnet core 140 to support the other end of the return spring 190, so that the lower end of the return spring 190 is supported by the spring support ledge 145 and the upper end of the return spring 190 is supported by the step portion 165 formed on the outer surface of the plunger 160.

The sleeve 170 is provided in a cylindrical shape, and is coupled to the outer surface of the magnet core 140. The sleeve 170 is provided at an upper side thereof with a domed closing portion 171 to close the upper side of the magnet core 140, and a flange portion 172 formed by bending a lower end of the sleeve 170 to be fixed to an inlet of the bore 111 of the modulator block 110. Since the flange portion 172 of the sleeve 170 coupled to the outer surface of the magnet core 140 is directly fixed to the modulator block 110, the assembly of the solenoid valve is facilitated and the manufacturing process of the solenoid valve is simplified.

The armature 180 is positioned inside the upper side of the sleeve 170, that is, inside the domed closing portion 171, and is installed to be reciprocated upward and downward. When power is applied to the excitation coil assembly (not shown), the armature 180 moves and pushes the plunger 160, so that the orifice 151 is closed.

The solenoid valve 100 according to the embodiment of the present invention includes a passage hole 142 formed in an inner circumferential surface of the magnet core 140, which faces the plunger 160, in a lengthwise direction of the through-hole 141, to prevent noise and degradation of the braking performance of the brake system that are caused by poor discharge of air remaining between the armature 180 and the magnet core 140 and between the magnet core 140 and the plunger 160.

Figure 2:
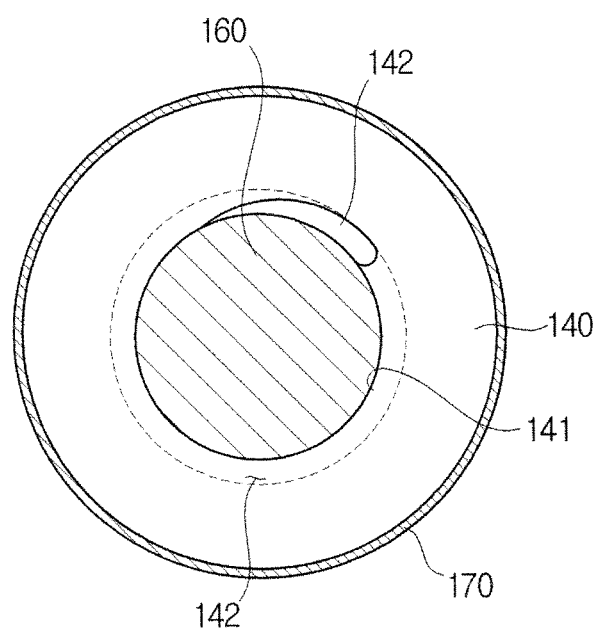
FIG. 2 is a cross-section view taken along line II-II' of FIG. 1.
Figure 3:
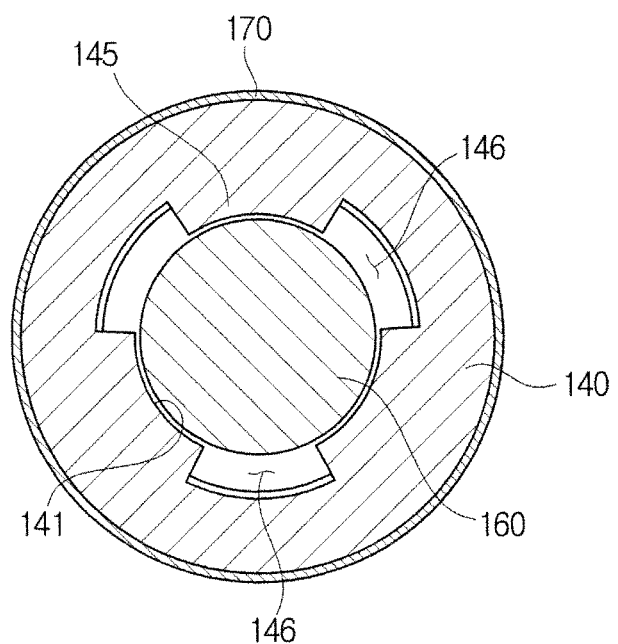
FIG. 3 is a cross-sectional view taken line along III-III' of FIG. 1.

In more detail, referring to FIG. 2, the passage hole 142 is formed in a spiral shape on the inner circumferential surface of the magnet core 140. Since the spiral is provided in a form rolling method by pressing a nut shaped form against the magnet core 140 having been subjected to forging, the manufacturing cost of the solenoid valve is reduced. In addition, the spiral shaped passage hole has a superior concentricity from being manufactured through the form rolling method, thereby effectively preventing center deviation of the plunger that may occur due to a repeated long-term use of the solenoid valve.

One end of the spiral communicates with a gap between the armature 180 and the magnet core 140, and the other end of the spiral communicates with a gap between the magnet core 140 and the plunger 160, for example, the other end of the spiral extends to the step portion 165 of the plunger 160 stepped outward to support the one end of the return spring 190.

Accordingly, the narrow gap between the armature 180 and the magnet core 140 and the narrow gap between the plunger 160 and the magnet core 140 are expanded due to the spiral shaped passage hole 142, so that air kept in the gaps is naturally discharged along a flow of oil caused by a motion of the plunger 160. The passage hole 142 inclined with respect to the lengthwise direction of the magnet core 140 results in a superior flow of oil when compared to a passage hole formed in a lengthwise direction.

Referring to FIG. 4, a transfer passage hole 146 is formed in the spring support ledge 145 of the magnet core 140 in a lengthwise direction of the through-hole. Air discharged through the passage hole 142 and then through the transfer passage hole 146 is discharged to the orifice side, and finally discharged to the outside of the solenoid valve.

According to the embodiment of the present invention, the passage hole 142 and the transfer passage hole 146 connected to each other enable the air kept in the valve 100 to be easily discharged to the outside of the solenoid valve during the operation of the solenoid valve.

The following description will be made in relation on the opening/closing operations of the solenoid valve for the brake system.

When power is not applied to the excitation coil assembly (not shown), the return spring 190 pushes the plunger 160 toward the armature 180 such that the opening/closing portion 161 of the plunger 160 is spaced apart from the orifice 151 so that the orifice 151 remains open.

Accordingly, oil introduced through the first passage 112 passes through the radial passage 142, the through-hole 141, the orifice 151 and the connecting passage 126, and finally flows to the second passage 113. At the same time, oil introduced through the first passage 112 passes through the bypass passage 123 formed at the periphery portion 121 of the filter member 120 and finally flows to the second passage 113.

In addition, air remaining between the magnet core 140 and the armature 180 and between the magnet core 140 and the plunger 160 may be easily discharged through the expanded passage formed by the passage hole 142 formed in the inner circumferential surface of the magnet core 140 and the transfer passage hole along a flow of oil caused by a motion of the plunger 160.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A solenoid valve for a brake system, the solenoid valve comprising:
   a magnet core that is provided in a cylindrical shape, is installed in a bore of a modulator block, and has a through-hole opening in a lengthwise direction thereof and a radial direction passage communicating with the through-hole; an armature that is installed at one end of the magnet core so as to be reciprocated; a valve seat that is provided at the other end of the magnet core and has an orifice; a plunger that is inserted into the through-hole and performs a sliding motion by the armature to open and close the orifice; a sleeve that is fixed to the bore while accommodating the armature and the magnet core; and a return spring that is provided to apply an elastic restorative force to the plunger to open the orifice,
   wherein a passage hole is provided in a spiral shape along the through-hole at an inner circumferential surface of the magnet core to discharge air between the magnet core and the plunger and air between the magnet core and the armature.

2. The solenoid valve of claim 1, wherein the passage hole is molded in a form rolling.

3. The solenoid valve of claim 1, wherein:
   the magnet core is provided at an inner circumferential surface thereof with a spring support ledge protruding to support a lower end of the return spring;
   the plunger is provided with an outer circumferential surface thereof with a step portion stepped inward to support an upper end of the return spring; and
   one end of the passage hole extends to a portion between the magnet core and the armature, and the other end of the passage hole extends to a portion between the spring support ledge and the step portion, to expand a gap between the magnet core and the armature and a gap between the magnet core and the plunger.

4. The solenoid valve of claim 3, wherein the passage hole connects to the orifice through a transfer passage hole formed lengthwise along the spring support ledge.

* * * * *